(12) United States Patent
Min (10) Patent No.: US 12,373,119 B2
(45) Date of Patent: Jul. 29, 2025

(54) MEMORY MANAGEMENT METHOD AND SEMICONDUCTOR DEVICE ADJUSTING SIZE OF CONTIGUOUS MEMORY ALLOCATION AREA

(71) Applicant: SAMSUNG ELECTRONICS CO., LTD., Suwon-si (KR)

(72) Inventor: Junghi Min, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/071,052

(22) Filed: Nov. 29, 2022

(65) Prior Publication Data

US 2023/0168822 A1 Jun. 1, 2023

(30) Foreign Application Priority Data

Nov. 30, 2021 (KR) ........................ 10-2021-0169496
Jul. 22, 2022 (KR) ........................ 10-2022-0091314

(51) Int. Cl.
*G06F 3/06* (2006.01)
(52) U.S. Cl.
CPC .......... *G06F 3/0631* (2013.01); *G06F 3/0619* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 6,370,633 B2 | 4/2002 | Sethi | |
| 6,968,439 B2 | 11/2005 | Wong et al. | |
| 7,392,363 B2 | 6/2008 | Fleming et al. | |
| 7,484,070 B1 | 1/2009 | Walton et al. | |
| 10,019,288 B2 * | 7/2018 | Kung | G06F 12/06 |
| 10,409,498 B2 * | 9/2019 | Kim | G06F 3/0679 |
| 2010/0153678 A1 | 6/2010 | Kang et al. | |

FOREIGN PATENT DOCUMENTS

JP 2017-162364 A 9/2017

OTHER PUBLICATIONS

Park, et al., "GCMA: Guaranteed Contiguous Memory Allocator", 2016, IEEE Transactions on Computers, 7 pages total.

* cited by examiner

*Primary Examiner* — Michael Alsip
(74) *Attorney, Agent, or Firm* — Sughrue Mion, PLLC (57) ABSTRACT

A memory management method is provided. The memory management method includes: allocating, by a processor, a partial area of a memory as a reserved area during booting; identifying, by the processor, a contiguous memory allocation (CMA) area in the reserved area based on a CMA request of a process, wherein the CMA request indicates a required size; adjusting, by the processor, a size of the CMA area based on the size of the CMA area and the required size; and allocating, by the processor, to the process, a portion of the memory in the adjusted CMA area corresponding to the required size.

16 Claims, 11 Drawing Sheets

MEMORY MANAGEMENT METHOD AND SEMICONDUCTOR DEVICE ADJUSTING SIZE OF CONTIGUOUS MEMORY ALLOCATION AREA

CROSS-REFERENCE TO RELATED APPLICATIONS

This application is based on and claims priority under 35 U.S.C. § 119 to Korean Patent Application Nos. 10-2021-0169496, filed on Nov. 30, 2021, and 10-2022-0091314, filed on Jul. 22, 2022, in the Korean Intellectual Property Office, the disclosures of which are incorporated by reference herein in their entireties.

BACKGROUND

The present disclosure relates to a semiconductor device, and more particularly, to a semiconductor device including a memory for allocating contiguous memory.

In order to restrict a user's access to data, such as multimedia data, the data may be stored in an allocated memory area by using a contiguous memory allocation (CMA) technique.

According to the CMA technique, a partial area of memory may be set to be reserved for contiguous memory allocation when the memory is booted. CMA allocation failure may occur when there is not enough contiguous memory area to store data. When CMA allocation fails, the space to store multimedia data becomes insufficient, and thus, quality of digital content service may deteriorate.

SUMMARY

One or more example embodiments provide a semiconductor device in which contiguous memory allocation (CMA) allocation performance is improved by adaptively adjusting the size of a CMA area, and a memory management method.

According to an aspect of an example embodiment, a memory management method includes: allocating, by a processor, a partial area of a memory as a reserved area during booting; identifying, by the processor, a contiguous memory allocation (CMA) area in the reserved area based on a CMA request of a process, wherein the CMA request indicates a required size; adjusting, by the processor, a size of the CMA area based on the size of the CMA area and the required size; and allocating, by the processor, to the process, a portion of the memory in the adjusted CMA area corresponding to the required size.

According to an aspect of an example embodiment, a memory management method includes: identifying, by a processor, a number of free pages of a contiguous memory allocation (CMA) type in a memory; comparing, by the processor, the number of free pages of the CMA type with a reference number; adjusting, by the processor, the number of free pages of the CMA type based on a result of the comparing; and allocating, by the processor, the adjusted number of free pages of the CMA type to a process based on a CMA request of the process.

According to an aspect of an example embodiment, a non-transitory computer-readable recording medium has recorded thereon a program for implementing a method including: allocating a partial area of a memory as a reserved area during booting; identifying a contiguous memory allocation (CMA) area in the reserved area based on a CMA request of a process, wherein the CMA request indicates a required size; adjusting a size of the CMA area based on the size of the CMA area and the required size; and allocating, to the process, a portion of the memory in the adjusted CMA area corresponding to the required size.

BRIEF DESCRIPTION OF THE DRAWINGS

The above and other aspects and features will be more apparent from the following description of example embodiments taken in conjunction with the accompanying drawings, in which.

DETAILED DESCRIPTION

Hereinafter, example embodiments will be described with reference to accompanying drawings. Embodiments described herein are example embodiments, and thus, the present disclosure is not limited thereto, and may be realized in various other forms. Each example embodiment provided in the following description is not excluded from being associated with one or more features of another example or another embodiment also provided herein or not provided herein but consistent with the present disclosure. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
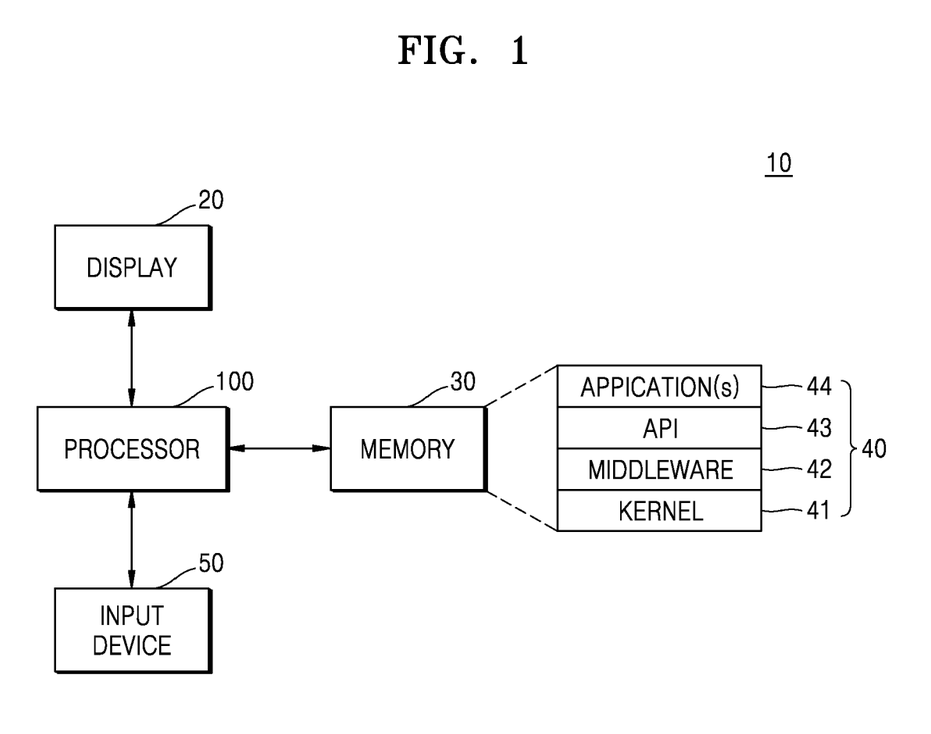
FIG. 1 is a diagram for explaining a semiconductor device according to an example embodiment.

FIG. 1 is a diagram for explaining a semiconductor device according to an example embodiment.

Referring to FIG. 1, a semiconductor device 10 may be implemented as a data processing device, such as a personal computer (PC), a tablet PC, a netbook, an e-reader, a personal digital assistant (PDA), a portable multimedia player (PMP), an MP3 player, or an MP4 player. The semiconductor device 10 may include a processor 100 that controls the overall operation of the semiconductor device 10. The processor 100 may include at least one of a central processing unit (CPU), an application processor (AP), and a communication processor (CP).

The processor 100 may read and execute program instructions. For example, the processor 100 may execute program instructions (e.g., program instructions generated by an input signal input via an input device 50), and control to read data stored in a memory 30 and to display the read data via a display 20.

The memory 30 may include a volatile memory or a non-volatile memory. The memory 30 may store a program 40. The program 40 may be referred to as software. The program 40 may include, for example, a kernel 41, middleware 42, an application programming interface (API) 43, and at least one application 44. At least some of the kernel 41, the middleware 42, and the API 43 may be referred to as an operating system (OS).

The kernel 41 may control or manage system resources, for example, the processor 100 or the memory 30, used to execute operations or functions implemented in other programs, such as the middleware 42, the API 43, or the at least one application 44. Also, the kernel 41 may provide an interface via which the middleware 42, the API 43, or the at least one application 44 may control or manage the system resources by accessing individual components of the semiconductor device 10.

The middleware 42 may, for example, function as an intermediary via which the API 43 or the at least one application 44 communicates with the kernel 41 to exchange data therebetween.

Also, the middleware 42 may process one or more task requests received from the at least one application 44 according to priority. For example, the middleware 42 may assign, to the at least one application 44, a priority by which a system resource, such as the processor 100 or the memory 30, of the semiconductor device 10 may be used. For example, the middleware 42 may perform scheduling or load balancing on the one or more task requests by processing the one or more task requests according to the priority assigned to the at least one application 44.

The API 43 is, for example, an interface via which the at least one application 44 controls a function provided from the kernel 41 or the middleware 42, and may include, for example, at least one interface or function (e.g., an instruction) for file control, window control, image processing, or character control.

The input device 50 may be implemented as a pointing device, such as a touch pad or a computer mouse, a key pad, or a keyboard.

The processor 100 may allocate a partial area of the memory 30 as a contiguous memory allocation (CMA) area according to a CMA request of the at least one application 44 by executing the OS. CMA may indicate allocating a contiguous memory area having a size that is greater than or equal to the size of a page. The CMA area may indicate a contiguous memory area having a size that is greater than or equal to the size of a page. The CMA area may be allocated to the at least one application 44, and the at least one application 44 may reserve the allocated CMA area.

According to an example embodiment, the semiconductor device 10 may adjust the size of the CMA area in the memory 30, based on the CMA request of the at least one application 44. The semiconductor device 10 may adjust the size of the CMA area by moving data of a first page block that is physically and consecutively arranged with a second page block that is a part of the CMA area, and setting the first page block as part of the CMA area.

The semiconductor device 10 may adjust the size of the CMA area in the memory 30, based on the size of the CMA area according to the CMA request and the size of the CMA area currently available in the memory 30.

The semiconductor device 10 may repeatedly monitor the size of the available CMA area in the memory 30, and may adjust the size of the CMA area so that the size of the available CMA area may be maintained within a certain range.

Figure 2:
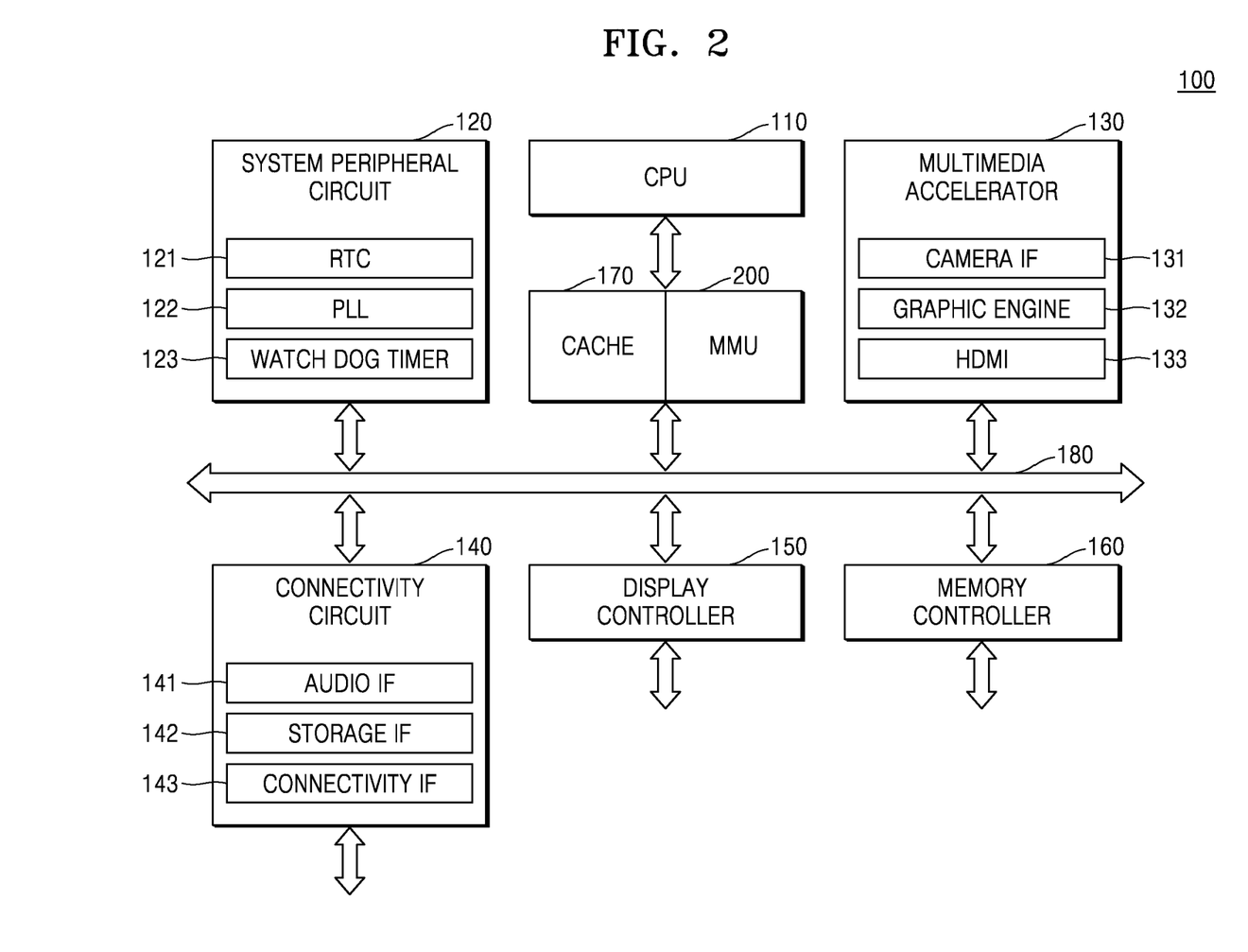
FIG. 2 is a block diagram of a processor shown in FIG. 1 according to an example embodiment.

FIG. 2 is a block diagram of the processor 100 shown in FIG. 1 according to an example embodiment.

Referring to FIGS. 1 and 2, the processor 100 may include a CPU 110, a cache 170, and a memory management unit (MMU) 200.

The CPU 110 may read and execute program commands.

The cache 170 may be a storage device that temporarily stores data read from the memory 30 to rapidly provide data to the CPU 110.

The MMU 200 may be a hardware component for processing a request from the processor 100 to access the memory 30.

The MMU 200 may translate virtual addresses into physical addresses, control the cache 170, and arbitrate a system bus 180.

The processor 100 may further include a system peripheral circuit 120, a multimedia accelerator 130, a connectivity circuit 140, a display controller 150, and a memory controller 160.

The system peripheral circuit 120, the multimedia accelerator 130, the connectivity circuit 140, the display controller 150, and the memory controller 160 may exchange data or commands with each other via the system bus 180.

The system bus 180 may include a plurality of channels. For example, the plurality of channels may include a read data channel, a read address channel, a write address channel, a write data channel, and a response channel.

The system peripheral circuit 120 may include a real-time clock (RTC) 121, a phase-locked loop (PLL) 122, and a watch dog timer 123.

The multimedia accelerator 130 may include a graphic engine 132. According to an example embodiment, the graphic engine 132 may be integrated with a frame buffer or another video display circuit to perform graphic calculation. According to an example embodiment, the multimedia accelerator 130 may include a camera interface 131, and a high-definition multimedia interface (HDMI) 133 which is an audio/video interface for transmitting uncompressed digital data.

According to an example embodiment, the MMU 200 may be used to translate a virtual address, such as a virtual address output from the graphic engine 132, into a physical address.

The connectivity circuit 140 may include an audio interface 141, a storage interface 142 such as an advanced technology attachment, and a connectivity interface 143. For example, the connectivity circuit 140 may communicate with the input device 50 using the connectivity interface 143.

The display controller 150 may control data to be displayed on the display 20.

According to an example embodiment, the MMU 200 may be used to translate a virtual address output from the display controller 150 into a physical address.

The memory controller 160 may be an interface via which the memory 30 may be accessed according to the type of the memory 30 (e.g., flash memory or dynamic random-access memory (DRAM)).

Figure 3:
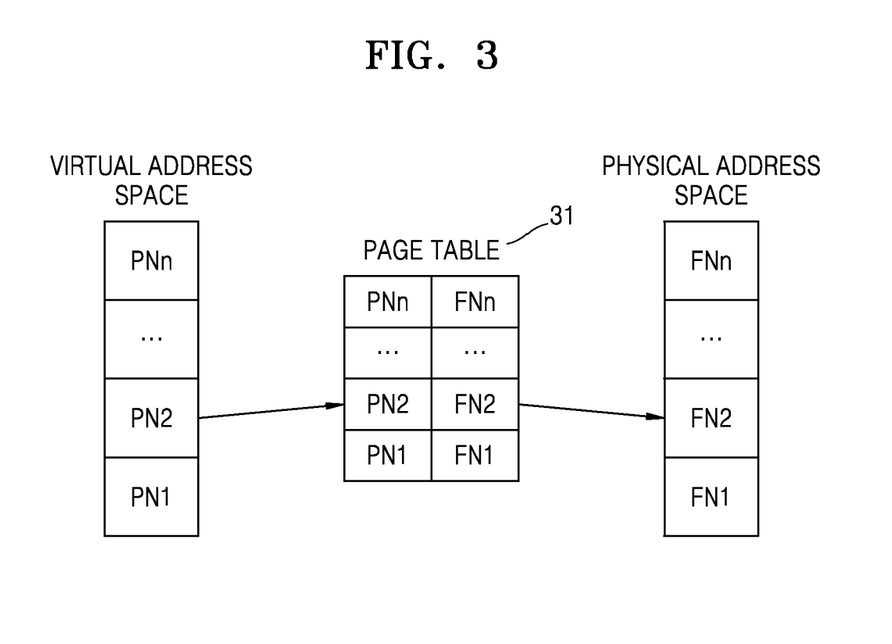
FIG. 3 is a diagram showing mapping between a virtual address and a physical address according to an example embodiment.

FIG. 3 is a diagram showing mapping between a virtual address and a physical address according to an example embodiment.

Referring to FIGS. 1 to 3, a virtual address space may be divided into a plurality of pages PN1 to PNn (n is a natural number of 2 or more).

Each of the plurality of pages PN1 to PNn may be a block of adjacent virtual addresses. Each of the plurality of pages PN1 to PNn may have a size of, for example, 4 KB. According to an example embodiment, the size of each of the plurality of pages PN1 to PNn may vary. Each of the plurality of pages PN1 to PNn may have a virtual address.

A physical address space may be divided into a plurality of frames FN1 to FNn, similar to a page of the virtual address space. Each of the plurality of frames FN1 to FNn may have a fixed size. The plurality of frames FN1 to FNn may represent a storage area in the memory 30. Each of the plurality of frames FN1 to FNn may have a physical address.

A page table 31 may have a mapping between a virtual address of a page and a physical address of a frame. The page table 31 may be stored in the memory 30, and the MMU 200 may convert the virtual address into the physical address with reference to the page table 31. At least one page table 31 may be provided in the memory 30 in correspondence to the at least one application 44. For example, a different page table may be provided in the memory 30 for each application.

Additionally, the page table 31 may also include information indicating a state of a frame corresponding to a physical address. For example, the page table 31 may further include information indicating whether a frame corresponding to a physical address has been loaded into the memory 30, information indicating a read/write mode for a frame, information indicating whether the at least one application 44 is accessible, or information indicating whether only the kernel 41 is accessible.

Figure 4:
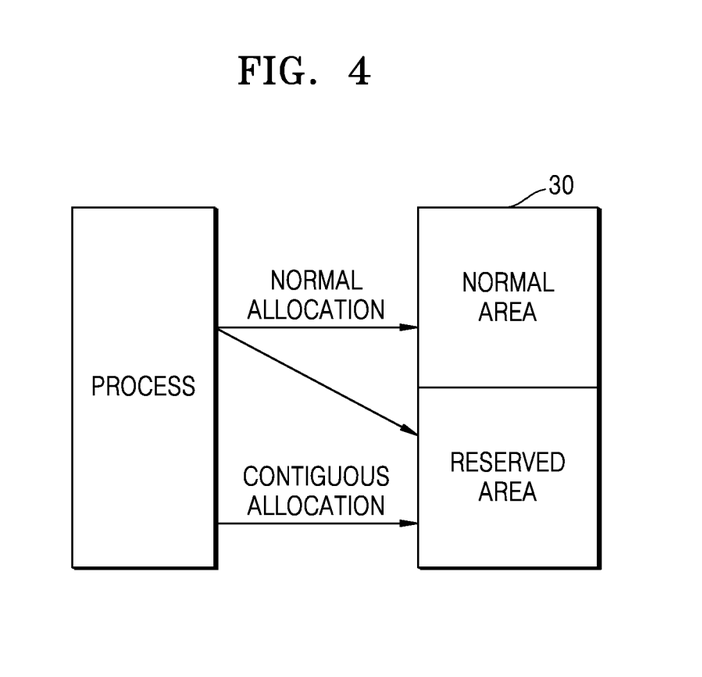
FIG. 4 is a diagram for explaining a memory allocation method according to an example embodiment.

FIG. 4 is a diagram for explaining a memory allocation method according to an example embodiment.

Referring to FIG. 4, the memory 30 may be divided into a normal area and a reserved area. Sizes of the normal area and the reserved area may be determined when the semiconductor device 10 is booted. A process may request allocation of a partial area of the memory 30 from the OS, and the OS may allocate the partial area of the memory 30 to the process. The process may mean an executing program (ex. the application of FIG. 1).

The process may request a normal allocation or a contiguous allocation from the OS. The normal allocation may be a non-contiguous allocation method. When the memory 30 is allocated by the normal allocation, various areas distributed in the memory 30 may be allocated to the process. When the memory 30 is allocated by the contiguous allocation, a contiguous area of the memory 30 may be allocated to the process.

The OS may allocate the normal area or the reserved area of the memory 30 to the process during the normal allocation. The OS may allocate the reserved area of the memory 30 to the process during the contiguous allocation. When the size of an available area is small (e.g., less than a threshold size) in the reserved area, the OS may secure additional memory area by moving data stored in the reserved area to the normal area. The OS may process the contiguous allocation, based on the secured available area.

When the size of an available area of the reserved area is smaller than the size of a contiguous area required by a contiguous allocation request and the required area is not able to be secured, the OS may provide memory allocation failure information to the process.

Figure 5:
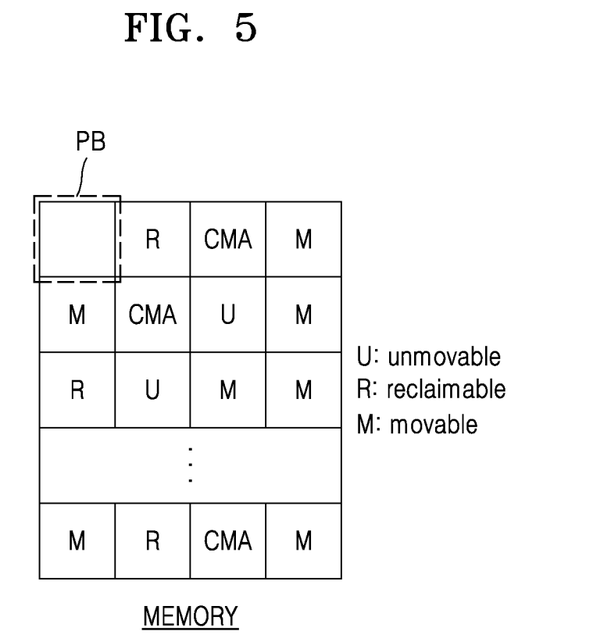
FIG. 5 is a diagram for explaining a reserved area of a memory, according to an example embodiment.

FIG. 5 is a diagram for explaining a memory according to an example embodiment. FIG. 5 will be described with reference to FIGS. 1 to 4.

Referring to FIG. 5, the memory 30 may include a plurality of page blocks PB. Each of the page blocks PB may include a plurality of pages. For example, one page block PB may include 1024 pages, and one page may have a size of 4 KB. Each page block PB may be included in the normal area or the reserved area.

A page block may be of an unmovable type, a reclaimable type, a movable type, or a CMA type. An unmovable page block may include pages storing data accessed by the kernel 41, that is, data that is not movable to another page. A reclaimable page block may include pages storing data that is not movable to another page, but is deletable. A movable page block may include pages that are movable to another page and deletable. A CMA page block may include pages that are allocated upon a CMA request.

In response to a CMA request, the OS may search for an available block among CMA page blocks, and may allocate, to the process, a CMA page block having a size corresponding to the request.

The types of page blocks may be determined during booting, and when there is lack of CMA page blocks, the semiconductor device 10 according to an example embodiment may convert a movable page block into a CMA page block. For example, when data has already been stored in the movable page block, the semiconductor device 10 may move the data to another page block and convert the movable page block into a CMA page block.

Figure 6:
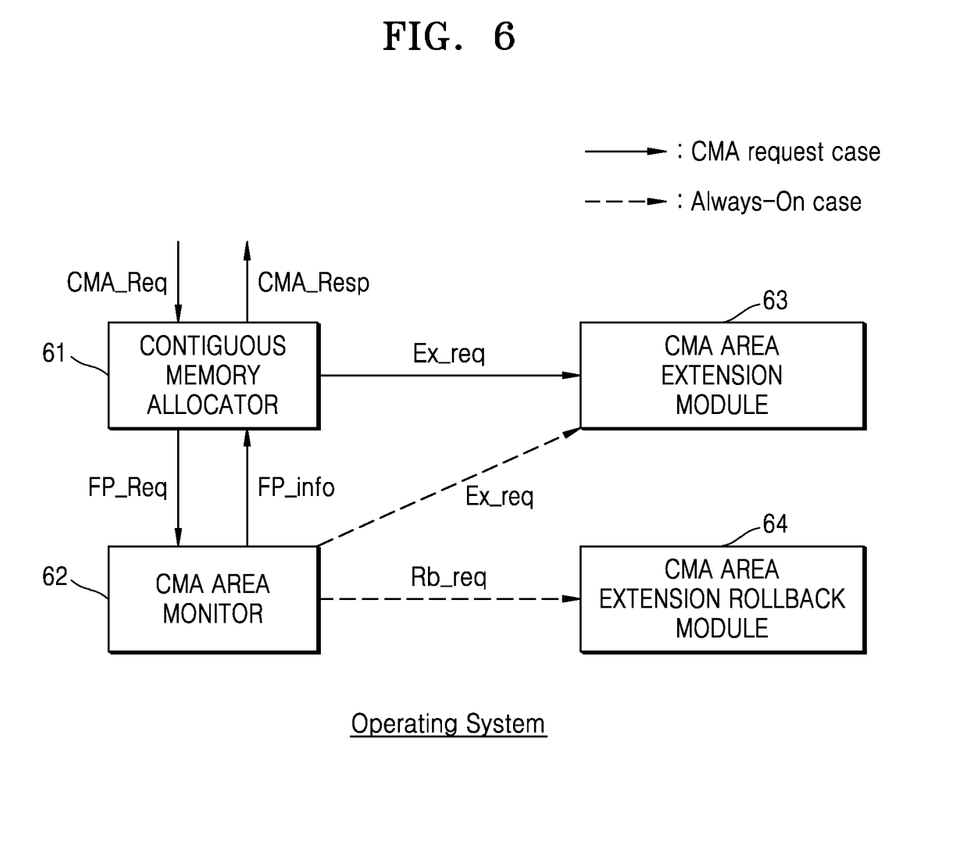
FIG. 6 is a block diagram for explaining operation of an operating system (OS), according to an example embodiment.
Figure 7:
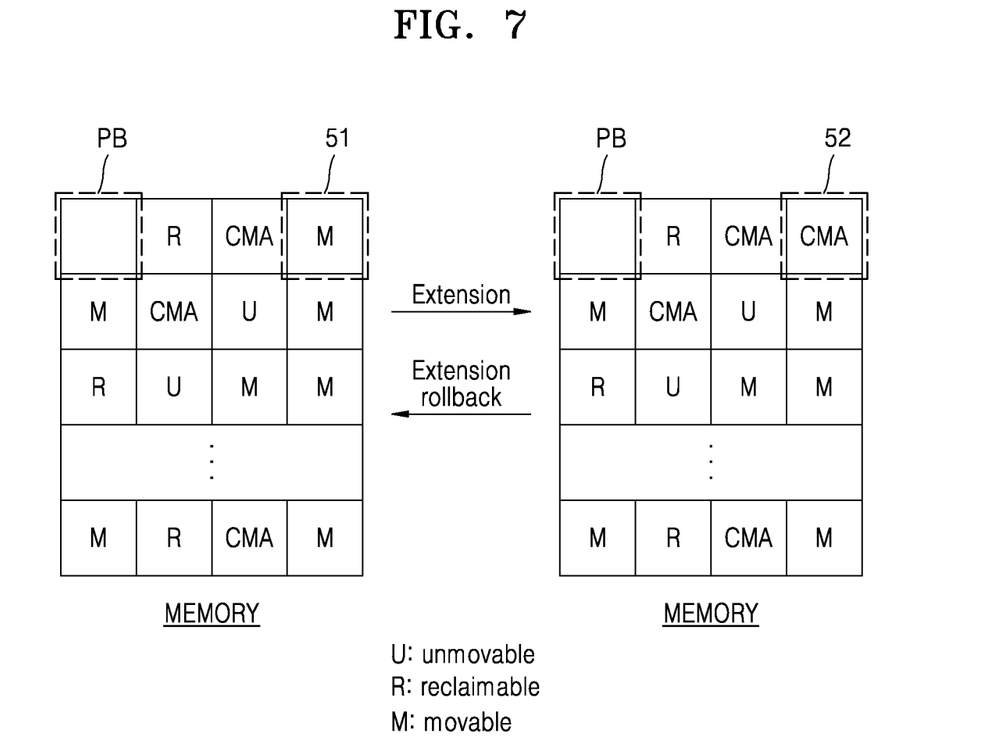
FIG. 7 is a diagram for explaining contiguous memory allocation (CMA) area extension and CMA area extension rollback according to an example embodiment.
Figure 8:
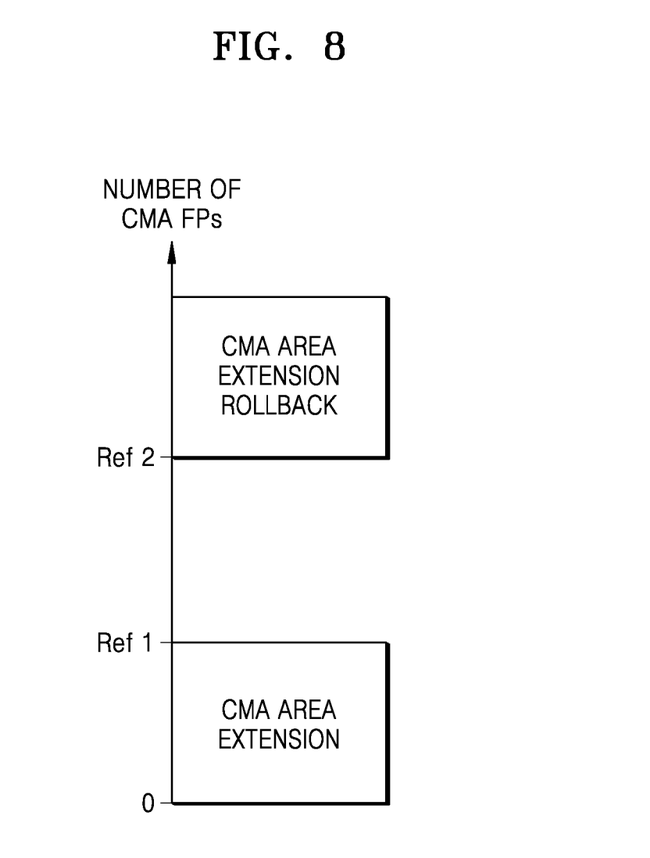
FIG. 8 is a diagram for explaining references of CMA area extension and CMA area extension rollback according to an example embodiment.

FIG. 6 is a block diagram for explaining operation of an OS, according to an example embodiment. FIG. 7 is a diagram for explaining CMA area extension and CMA area extension rollback according to an example embodiment. FIG. 8 is a diagram for explaining references of CMA area extension and CMA area extension rollback according to an example embodiment. FIGS. 6, 7, and 8 will be described with reference to FIGS. 1 to 5.

Referring to FIG. 6, the OS may include a CMA 61, a CMA area monitor 62, a CMA area extension module 63, and a CMA area extension rollback module 64. The OS may manage a memory based on a method of extending a CMA area according to a CMA request (CMA request case) and a method of always monitoring a CMA area (Always-on case). The OS may manage the memory by being executed by the processor 100.

In the method of extending a CMA area according to a CMA request (CMA request case), the CMA 61 may provide, to the process, a CMA response CMA_Resp in response to a CMA request CMA_Req provided from the process. The CMA request CMA_Req may indicate the size of a contiguous memory area required by the process. The CMA response CMA_Resp may be completion information or failure information for CMA area allocation. In detail, the CMA 61 may provide a free page request FP_Req to the CMA area monitor 62.

The CMA area monitor 62 may provide, to the CMA 61, free page information FP_info about a free page in the CMA area in the reserved area. The free page may be a CMA page in which data is not stored, or a page available as the CMA area. The free page information FP_info may indicate the number of free pages.

The CMA 61 may compare the size of the contiguous memory area required by the process with the size of an area available as the CMA area, based on the free page information FP_info. In detail, the CMA 61 may compare the number of free pages required by the process with the number of available free pages, and may provide a CMA area extension request Ex_req to the CMA area extension module 63, based on a result of the comparison. In some example embodiments, the CMA 61 may compare a value obtained by subtracting a first reference number Ref 1 from the number of free pages available as the CMA area with the number of free pages required by the process, and may provide the CMA area extension request Ex_req to the CMA area extension module 63, based on a result of the comparison.

Referring to FIGS. 6 and 7, the CMA area extension module 63 may convert a movable page block 51 into a CMA page block 52. Because the CMA page block 52 is adjacent to another CMA page block, the size of an available CMA area may increase. For example, as the number of CMA page blocks increases, the number of free pages may increase. In some example embodiments, the CMA area extension module 63 may provide, to the CMA area extension rollback module 64, information about a position and size of the page block converted into the CMA type.

Referring to FIG. 6, in the method of always monitoring the CMA area (Always-on case), the CMA area monitor 62 may monitor the number of free pages of the CMA area. Referring to FIG. 8, the CMA area monitor 62 may provide a CMA area extension request Ex_req to the CMA area extension module 63 when the number of free pages is less than the first reference number Ref 1. The CMA area monitor 62 may provide a CMA area extension rollback request Rb_req to the CMA area extension rollback module 64 when the number of free pages is greater than a second reference number Ref 2.

Referring to FIGS. 6 and 7, the CMA area extension rollback module 64 may convert the CMA page block 52 into the movable page block 51. As the number of CMA page blocks decreases, the number of free pages may decrease. In some example embodiments, the CMA area extension rollback module 64 may specify a page block based on information about a position and size of the page block converted into the CMA type, and may convert the specified page block into the movable type.

According to an example embodiment, the CMA 61 may additionally secure a CMA area by changing a type of a page block even when the size of the CMA area is small. Therefore, the probability of CMA allocation failure is reduced, and thus, storage performance for data (e.g., secure data and multimedia data) that requires CMA may be improved.

Figure 9:
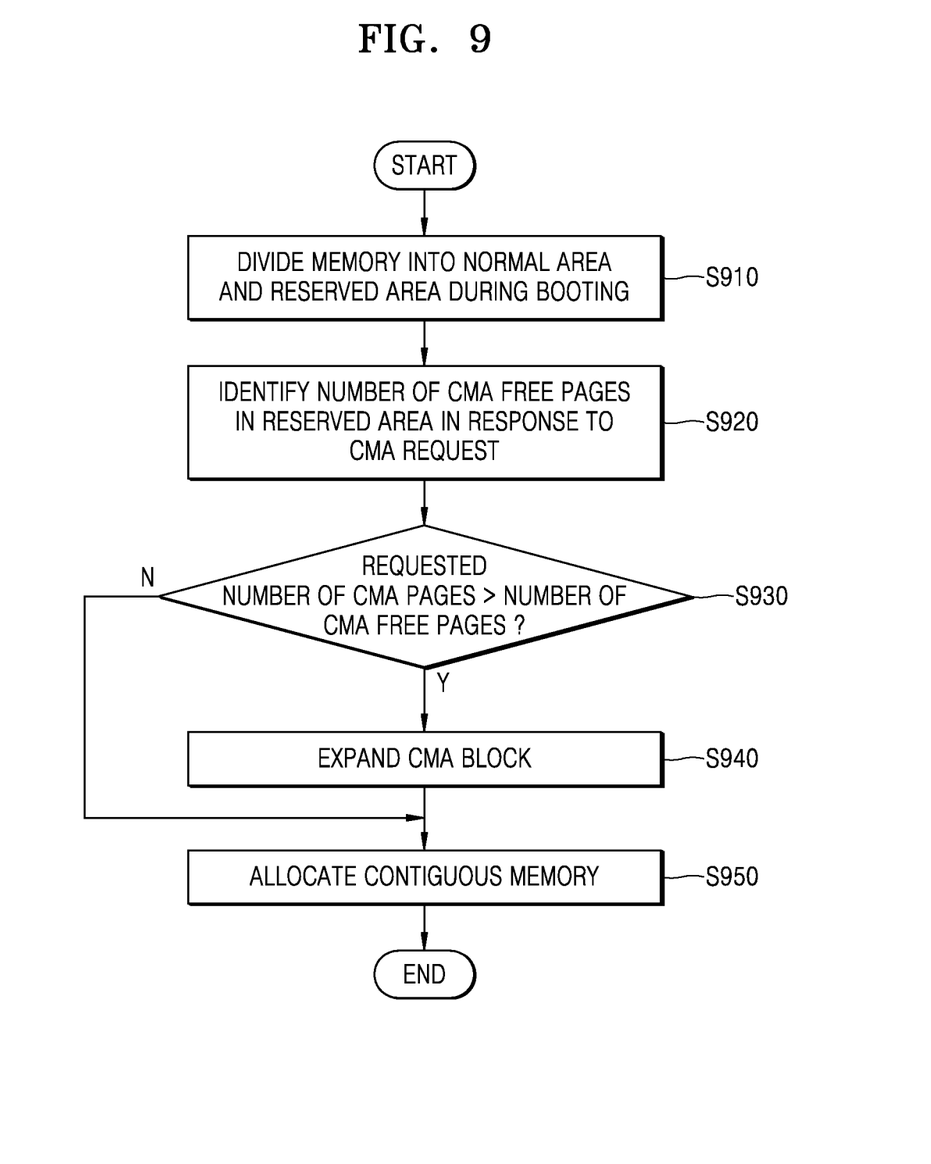
FIG. 9 is a flowchart for explaining a memory management method of a semiconductor device, according to an example embodiment.

FIG. 9 is a flowchart for explaining a memory management method of a semiconductor device, according to an example embodiment. FIG. 9 will be described with reference to FIGS. 1 to 8. The memory management method may include a plurality of operations S910 to S950.

In operation S910, the semiconductor device 10 may divide the memory 30 into a normal area and a reserved area during booting. The normal area may be a memory area allocated in response to a non-contiguous memory allocation request, and the reserved area may be a memory area allocated in response to a CMA request.

In operation S920, the semiconductor device 10 may identify the number of CMA free pages in the reserved area in response to the CMA request. The number of CMA free pages may be identified by detecting CMA page blocks among page blocks included in the reserved area, and detecting CMA page blocks consecutively arranged among the detected CMA page blocks. A page block may include a plurality of pages. For example, the page block may include 1024 pages.

In operation S930, the semiconductor device 10 may compare the number of CMA pages requested by the CMA request with the number of CMA free pages in the reserved area. When the requested number of CMA pages is greater than the number of CMA free pages, operation S940 may be performed. Otherwise, operation S950 may be performed without performing operation S940.

In operation S940, the semiconductor device 10 may extend a CMA block in the reserved area. In detail, the semiconductor device 10 may increase the number of CMA blocks by converting a page block that is a type other than the CMA type into the CMA type.

In operation S950, the semiconductor device 10 may allocate a contiguous memory to a process based on the CMA blocks that are increased in number.

Based on the memory management method according to an example embodiment, because the size of the CMA area may be adjusted according to the CMA request, the probability of allocation failure may be reduced, and thus, data storage performance may be improved.

Figure 10:
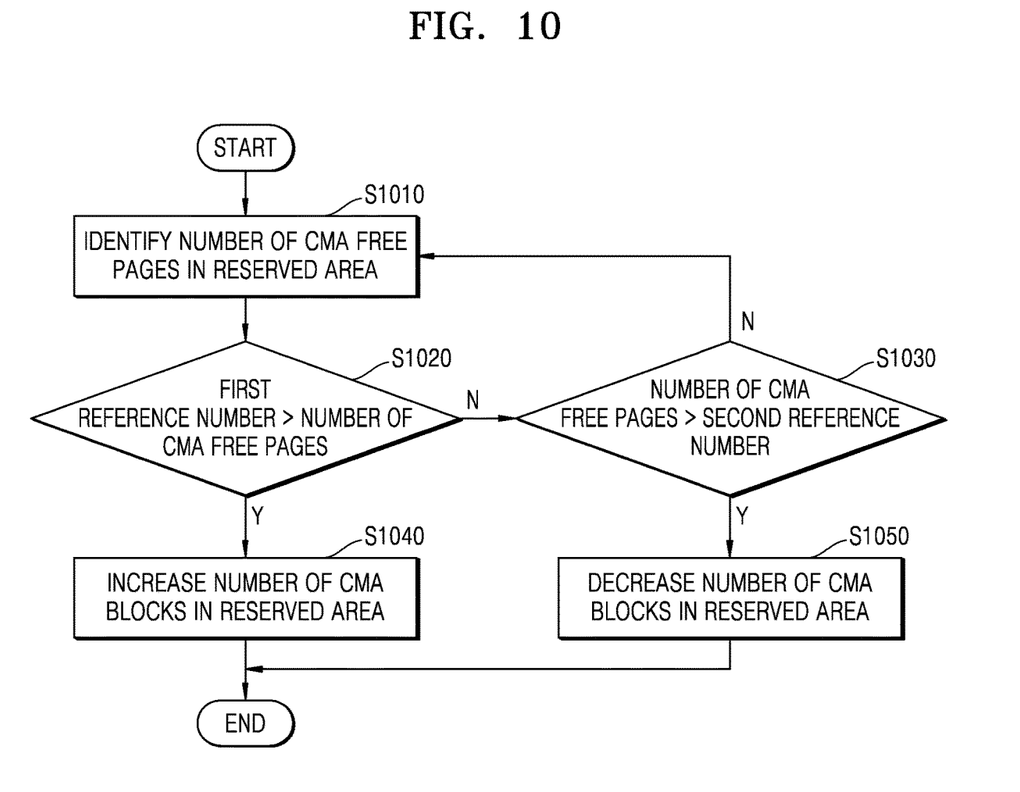
FIG. 10 is a flowchart for explaining a memory management method of a semiconductor device, according to an example embodiment.

FIG. 10 is a flowchart for explaining a memory management method of a semiconductor device, according to an example embodiment. The memory management method may include a plurality of operations S1010 to S1050. FIG. 10 will be described with reference to FIGS. 1 to 9.

In operation S1010, the semiconductor device 10 may monitor the number of CMA free pages in the reserved area. In detail, the CMA area monitor 62 may monitor the number of CMA free pages by periodically identifying the number of CMA blocks available for CMA allocation. A CMA block may include a plurality of CMA free pages. For example, the CMA block may include 1024 CMA free pages.

In operation S1020, the semiconductor device 10 may compare the number of CMA free pages with the first reference number Ref 1. When the number of CMA free pages is less than the first reference number Ref 1, operation S1040 may be performed. Otherwise, operation S1030 may be performed.

In operation S1040, the semiconductor device 10 may increase the number of CMA blocks in the reserved area. For example, the semiconductor device 10 may increase the number of CMA blocks so that the number of CMA blocks is greater than or equal to the first reference number Ref 1.

In operation S1030, the semiconductor device 10 may compare the number of CMA free pages with the second reference number Ref 2. When the number of CMA free pages is greater than the second reference number Ref 2, operation S1050 may be performed. Otherwise, operation S1010 may be performed again. The second reference number Ref 2 may be greater than the first reference number Ref 1.

In operation S1050, the semiconductor device 10 may decrease the number of CMA blocks in the reserved area. For example, the semiconductor device 10 may decrease the number of CMA blocks so that the number of CMA blocks is less than or equal to the second reference number Ref 2.

Figure 11:
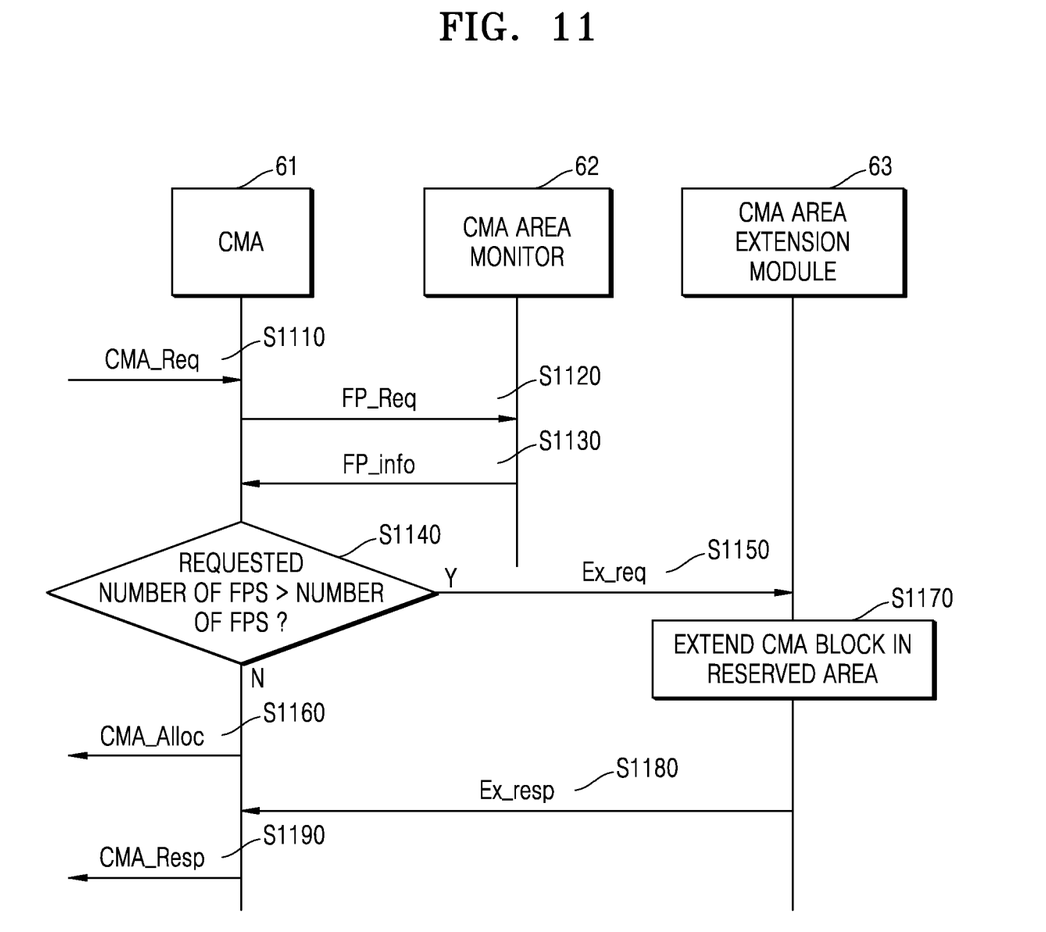
FIG. 11 is a diagram for explaining a memory management method performed based on a CMA request, according to an example embodiment.

FIG. 11 is a diagram for explaining a memory management method performed based on a CMA request, according to an example embodiment. FIG. 11 will be described with reference to at least one of FIGS. 1 to 10.

The CMA 61 may receive the CMA request CMA_Req from the process (S1110). The CMA request CMA_Req may be a request for allocation of a contiguous memory area in the memory 30.

The CMA 61 may provide, to the CMA area monitor 62, the free page request FP_Req for the number of CMA free pages (S1120).

The CMA area monitor 62 may identify the number of CMA free pages, and may provide, to the CMA 61, the free page information FP_info about the identified number of CMA free pages (S1130).

The CMA 61 may compare the requested number of CMA free pages with the identified number of CMA free pages (S1140).

When the requested number of CMA free pages is not greater than the identified number of CMA free pages, the CMA 61 may allocate CMA to the process (S1160). In some example embodiments, when the requested number of CMA free pages is not greater than a value obtained by subtracting the first reference number Ref 1 from the identified number of CMA free pages, the CMA 61 may allocate CMA to the process.

When the requested number of CMA free pages is greater than the identified number of CMA free pages, the CMA 61 may provide the CMA area extension request Ex_req to the CMA area extension module 63 (S1150).

The CMA area extension module 63 may extend a CMA block in the reserved area in response to the CMA area extension request Ex_req. In detail, the CMA area extension module 63 may increase the number of CMA blocks by converting a page block of another type into the CMA type (S1170). The CMA area extension module 63 may store information about a position and size of the block converted into the CMA block. The CMA area extension module 63 may provide, to the CMA 61, response information Ex_resp indicating completion of CMA extension (S1180).

The CMA 61 may determine whether a requested CMA area may be allocated to the process based on the extended CMA block, and may provide the CMA response CMA_Resp to the process (S1190). In detail, when the requested number of CMA free pages is not greater than the number of CMA free pages, the CMA area may be allocated to the process, and when the requested number of CMA free pages is greater than the number of CMA free pages, CMA allocation failure information may be provided to the process.

Figure 12:
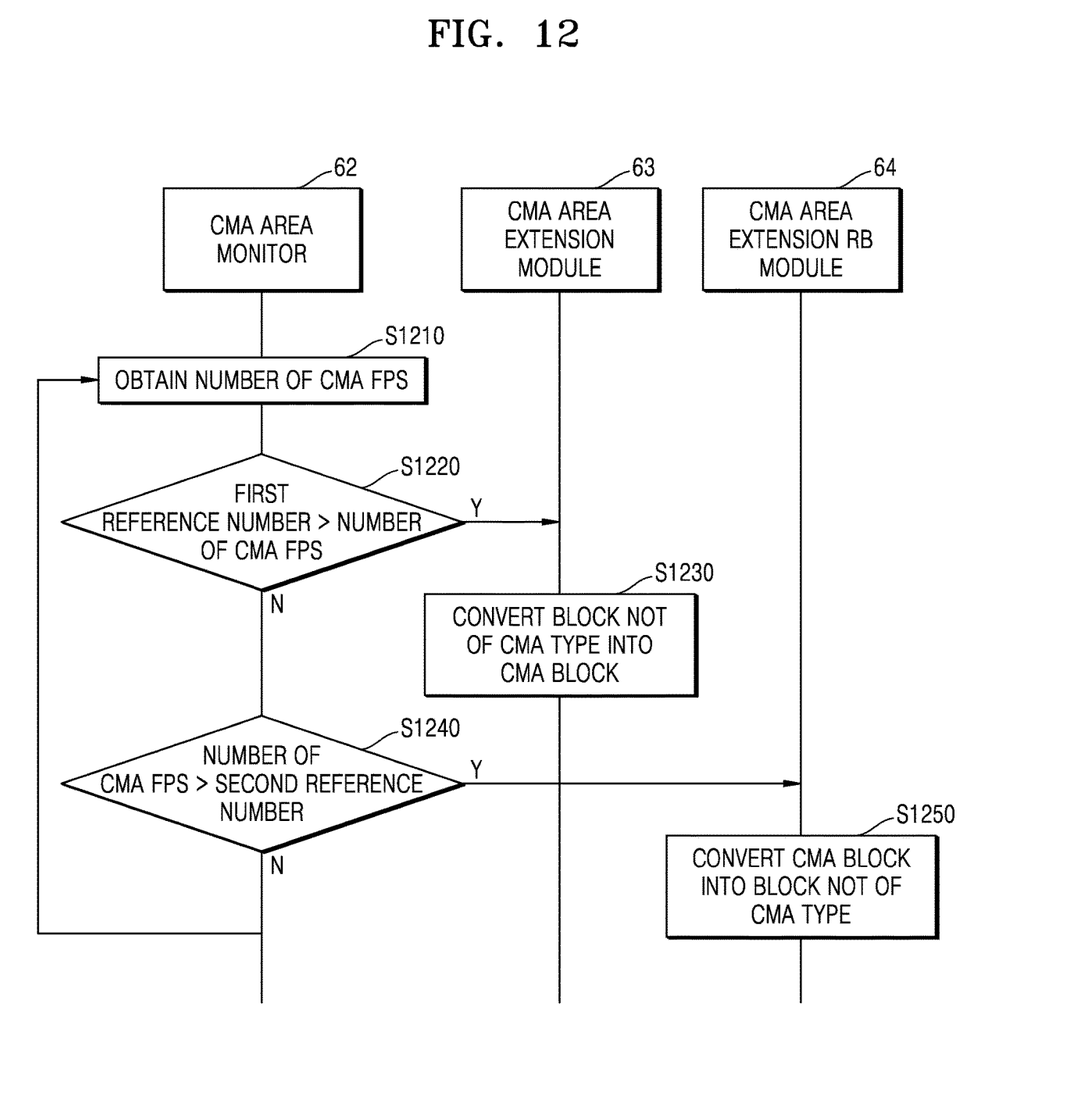
FIG. 12 is a diagram for explaining a memory management method for adjusting the number of CMA blocks, according to an example embodiment.

FIG. 12 is a diagram for explaining a memory management method for adjusting the number of CMA blocks, according to an example embodiment. FIG. 12 will be described with reference to at least one of FIGS. 1 to 11.

The CMA area monitor 62 may obtain the number of CMA free pages in the reserved area (S1210). For example, the CMA area monitor 62 may obtain the number of CMA free pages based on bitmap information indicating whether a CMA page has already been allocated to the process. The CMA free page may be a CMA page allocable to the process.

The CMA area monitor 62 may compare the number of CMA free pages with the first reference number Ref 1 (S1220).

When the number of CMA free pages is less than the first reference number Ref 1, the CMA area monitor 62 may request CMA area extension from the CMA area extension module 63, and the CMA area extension module 63 may convert a block of another type into a CMA block (S1230). Accordingly, the number of CMA free pages may be greater than the first reference number Ref 1.

When the number of CMA free pages is greater than the second reference number Ref 2, the CMA area monitor 62 may request CMA area extension rollback from the CMA area extension rollback module 64, and the CMA area extension rollback module 64 may convert a CMA block into a block not of the CMA type (S1250). Accordingly, the number of CMA free pages may be less than the second reference number Ref 2.

When the number of CMA free pages is not less than the first reference number Ref 1 and not greater than the second reference number Ref 2, the CMA area monitor 62 may obtain the number of CMA free pages again.

According to an example embodiment, the number of CMA free pages is maintained to be not less than the first reference number Ref 1 and not greater than the second reference number Ref 2, and thus, performance of processing CMA allocation requests may be improved.

While aspects of example embodiments have been particularly shown and described, it will be understood that various changes in form and details may be made therein without departing from the spirit and scope of the following claims.

What is claimed is:

1. A memory management method comprising:
   allocating, by a processor, a partial area of a memory as a reserved area during booting;
   allocating another partial area of the memory as a normal area during booting;
   identifying, by the processor, a contiguous memory allocation (CMA) area in the reserved area;
   identifying, by the processor, a number of free pages in the CMA;
   comparing the number of free pages in the CMA area with a first reference value;
   comparing the number of free pages in the CMA area with a second reference value;
   adjusting, by the processor, a size of the CMA area; and
   allocating, by the processor, to a process, a portion of the memory in the adjusted CMA area corresponding to a required size indicated by a CMA request of the process,
   wherein the adjusting the size of the CMA area comprises increasing the size of the CMA area based on the number of free pages in the CMA area being less than the first reference value and decreasing the CMA area based on the number of free pages in the CMA area being greater than the second reference value,
   wherein the second reference value is greater than the first reference value, and
   wherein the increasing the size of the CMA area comprises converting a movable block that is outside the CMA area to a CMA within the CMA area.

2. The memory management method of claim 1, wherein the adjusting the size of the CMA area comprises:
   identifying a size of a first area by subtracting the first reference value from the size of the identified CMA area; and
   adjusting the size of the CMA area based on the required size being larger than the first area.

3. The memory management method of claim 2, wherein the allocating the portion of the memory comprises providing a CMA failure signal to the process based on the required size being larger than the adjusted size of the CMA area.

4. The memory management method of claim 1, wherein the adjusting the size of the CMA area comprises converting an area into the CMA area.

5. The memory management method of claim 4, wherein the adjusting the size of the CMA area further comprises storing a position and size of the area to be converted into the CMA area.

6. The memory management method of claim 5, wherein the adjusting the size of the CMA area further comprises converting the CMA area into another type of area.

7. The memory management method of claim 6, wherein the adjusting the size of the CMA area further comprises:
identifying the CMA area, based on the position and size of the area to be converted into the CMA area; and
changing a type of the CMA area into another area.

8. A memory management method comprising:
identifying, by a processor, a number of free pages of a contiguous memory allocation (CMA) type within a CMA area in a memory;
comparing, by the processor, the number of free pages of the CMA type with a first reference number and a second reference number that is greater than the first reference number;
adjusting, by the processor, a size of the CMA area and the number of free pages of the CMA type based on a result of the comparing; and
allocating, by the processor, the adjusted number of free pages of the CMA type to a process based on a CMA request of the process,
wherein the adjusting the number of free pages of the CMA type comprises:
converting a movable block that is outside the CMA area to a CMA within the CMA area to increase the size of the CMA area and the number of free pages of the CMA type based on the number of free pages of the CMA type being less than the first reference number; and
decreasing the size of the CMA area and the number of free pages of the CMA type based on the number of free pages of the CMA type being greater than the second reference number.

9. The memory management method of claim 8, wherein the identifying the number of free pages of the CMA type comprises obtaining bitmap information indicating whether a free page of the CMA type is allocated to the process.

10. The memory management method of claim 8, wherein the increasing the size of the CMA area and the number of free pages of the CMA type comprises:
moving data stored in a first page that is a type other than the CMA type, to a second page; and
designating the first page as the CMA type.

11. The memory management method of claim 8, wherein the allocating the adjusted number of free pages of the CMA type to the process comprises providing allocation failure information to the process when the adjusted number of free pages of the CMA type is less than a required number of free pages indicated by the CMA request.

12. A non-transitory computer-readable recording medium having recorded thereon a program for implementing a method including:
allocating a partial area of a memory as a reserved area during booting;
identifying a contiguous memory allocation (CMA) area in the reserved area;
identifying a number of free pages in the CMA;
comparing the number of free pages in the CMA area with a first reference value;
comparing the number of free pages in the CMA area with a second reference value;
adjusting a size of the CMA area; and
allocating, to a process, a portion of the memory in the adjusted CMA area corresponding to a required size indicated by a CMA request of the process,
wherein the adjusting the size of the CMA area comprises increasing the size of the CMA area based on the number of free pages in the CMA area being less than the first reference value and decreasing the CMA area based on the number of free pages in the CMA area being greater than the second reference value,
wherein the second reference value is greater than the first reference value, and
wherein the increasing the size of the CMA area comprises converting a movable block that is outside the CMA area to a CMA within the CMA area.

13. The non-transitory computer-readable recording medium of claim 12, wherein the adjusting the size of the CMA area comprises:
identifying a size of a first area by subtracting the first reference value from the size of the identified CMA area; and
adjusting the size of the CMA area based on the required size being larger than the first area.

14. The non-transitory computer-readable recording medium of claim 12, wherein the adjusting the size of the CMA area further comprises converting an area into the CMA area.

15. The non-transitory computer-readable recording medium of claim 13, wherein the adjusting the size of the CMA area further comprises converting the CMA area into another type of area.

16. The memory management method of claim 1, wherein the increasing the size of the CMA area is performed based on the number of free pages in the CMA area being less than the first reference value, and
wherein the decreasing the size of the CMA area is performed based on the number of free pages in the CMA area being greater than the second reference value.

* * * * *